United States Patent
Sure et al.

(10) Patent No.: US 7,589,917 B2
(45) Date of Patent: Sep. 15, 2009

(54) COLLIMATING FRESNEL LENS WITH DIFFUSER APPEARANCE

(75) Inventors: Anita Sure, Bangalore (IN); Venkataraman Krishnasamy, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 7 days.

(21) Appl. No.: 11/977,486

(22) Filed: Oct. 25, 2007

(65) Prior Publication Data
US 2009/0109550 A1   Apr. 30, 2009

(51) Int. Cl.
*G02B 3/08* (2006.01)
*G02B 27/10* (2006.01)

(52) U.S. Cl. ............... 359/742; 359/619; 359/621; 359/625; 359/627

(58) Field of Classification Search ........... 359/741, 359/742, 726, 618, 619, 621, 625, 627
See application file for complete search history.

(56) References Cited

U.S. PATENT DOCUMENTS

| 5,151,826 | A | 9/1992 | Pasco | 359/742 |
|---|---|---|---|---|
| 5,398,137 | A | 3/1995 | Ishikawa et al. | 359/742 |
| 5,543,870 | A | 8/1996 | Blanchard | 353/74 |
| 5,566,023 | A * | 10/1996 | Kley | 359/569 |
| 6,146,004 | A | 11/2000 | Flottmeyer et al. | 362/522 |
| 6,805,476 | B2 | 10/2004 | Amano | 362/545 |
| 6,899,451 | B2 | 5/2005 | Kittelmann et al. | |
| 6,989,768 | B2 | 1/2006 | DeMarco et al. | 340/981 |
| 7,190,864 | B2 | 3/2007 | Jiang et al. | 385/50 |
| 7,224,526 | B2 | 5/2007 | Putilin et al. | |
| 7,239,444 | B2 | 7/2007 | Mizuno et al. | |
| 2004/0032664 | A1 | 2/2004 | Miller et al. | 359/619 |
| 2007/0153402 | A1 | 7/2007 | Destain | 359/742 |

FOREIGN PATENT DOCUMENTS

| JP | 11-142613 A | 5/1999 |
|---|---|---|
| KR | 10-2007-0001053 | 1/2007 |
| WO | WO 2006/051536 A1 | 5/2006 |
| WO | WO 2006/051536 B1 | 5/2006 |
| WO | WO 2007/078977 A1 | 7/2007 |

* cited by examiner

*Primary Examiner*—William C Choi
*Assistant Examiner*—Jack Dinh
(74) *Attorney, Agent, or Firm*—Kermit D. Lopez; Luis M. Ortiz

(57) ABSTRACT

A Fresnel lens having a curved surface and a large number of Fresnel lens steps with rectangular cross sections for enhancing the aesthetics while providing a diffuser appearance. The cylindrical Fresnel lens can be uniformly divided into rectangular sections across the lens axis. The rectangular sections are alternative and are offset from the curved surface by a distance, which produces a very parallel output beam. The front face of the cylindrical Fresnel lens provides a square like pattern, which results in an aesthetic appearance with the effective usage of light and reduced production costs.

20 Claims, 9 Drawing Sheets

COLLIMATING FRESNEL LENS WITH DIFFUSER APPEARANCE

TECHNICAL FIELD

Embodiments are generally related to collimating lens devices. Embodiments are also related to cylindrical Fresnel lenses and diffusers.

BACKGROUND OF THE INVENTION

A collimating lens can be utilized to direct the light output to a required region. With a light source in the center, the collimating lens can be designed so that it has a focal point in the center. Light emitted from the light source passes through the lens and converges on parallel beams of light at the height of the lens. A typical collimating lens has a plane appearance and may harm the human eye if looking directly at the collimating lens. A Fresnel lens, on the other hand, does the function in a manner similar to that of a collimating lens, but removes the plane appearance in one axis and is less harmful to its counterpart-collimating lens. A Fresnel lens is generally more compact and less expensive than its bulk optic counterpart. The Fresnel lens is also well suited for optical systems that do not require a high wave front quality. One such system is the illumination-portion of a projection system, which gathers as much light as possible from an extended source and directs it onto a pixilated panel.

The Fresnel lens can be configured as a special optical lens made from plastic such as, for example, acrylic, Polymethylmethacrylate (PMMA), polyvinyl chloride (PVC), polycarbonate (PC) and High Density Polyethylene (HDPE). Modern Fresnel lenses are often employed as light condensers, illuminators, and magnifiers, and in many other applications. Fresnel lenses basically include a series of concentric prismatic grooves, designed to cooperatively direct incident light rays to a common focus. This type of lens is thin, lightweight, and includes a high aperture. Also, this type of lens can be accurately mass-produced utilizing replication techniques.

Generally, in prior art Fresnel lenses intended for visible light applications, the grooves are all the same width, so that the groove density is constant across the lens. The depth of the grooves increases as the distance between the groove and the center of the lens increases. The depth of the deepest groove places a limit on the minimum thickness of the lens. Therefore, if the depth of the grooves can be reduced, the thickness of the lens can be reduced. Diffraction effects, however, caused by the grooves of the lens provide different path lengths, which can give rise to a destructive interference at the detector, whereby the efficiency of the lens is further impaired.

Referring to FIG. 1 a front view of a prior art Fresnel lens 100 with "V" grooves is illustrated. The prior art Fresnel lens 100 depicted in FIG. 1 includes grooves 110. The Fresnel lens 100 has a front face 130 and a mounting bracket 120. Parallel grooves 110 can be created in between the Fresnel Lens 100 in order to avoid the plain appearance in front of the Lens. Each groove 110 is triangular in cross section and is parallel to each other. The Fresnel lens 100 removes the plane appearance in one axis and is less harmful to its counterpart-collimating lens. Grooves 110 are generally provided as "V" grooves, which reduce the light output at the required area.

Referring to FIG. 2, a perspective view of a Fresnel lens 200 with "V" grooves is illustrated. The Fresnel lens 200 depicted in FIG. 2 possesses a body 130 and a mounting bracket 120. Note that in FIGS. 1-2, identical or similar blocks and elements are generally indicated by identical reference numerals. One surface of the body 130 is flat. The other surface of the body 130 houses the Fresnel lens 200 with a plurality of concentric grooves 110. Other types of prior art lenses possess grooves on both sides. Each groove 110 can contain a side 140, which extends from the surface of the lens 200 to an innermost point 150. It is known in the art that a spherical surface on a lens such as lens 100 and/or 200 can produce a spherical aberration. The grooves 110, however, in the Fresnel lens 200 introduce a scattering effect and refract some of the rays in undesired directions.

Referring to FIG. 3, a prior art graph 300 illustrates a simulation result of a Fresnel lens with "V" grooves. As shown in FIG. 2, the grooves 110 reduce light output at required area. The total light at required location is only four lumens. The prior art Fresnel lens 100 and/or 200 will encounter a difficulty in precisely controlling the light paths. As a result, parallel rays cannot be obtained over the entire surface of the inner Fresnel lens 100/200, and the brightness distribution will be uneven. This is a natural result of a fact that fine optical designing is not performed on the lens steps in accordance with the surface shape of the Fresnel lens 100 or 200.

The portion of the Fresnel lens 100 or 200 that is substantially curved will cause a considerable deviation from the desired brightness distribution due to a contribution of unexpected rays. Designing the prior art Fresnel lens 100 or 200 with grooves 110, however, cannot be obtained easily. Therefore, much time and work are needed to design the Fresnel lens 100/200, and its final design and performance will depend on the experiences of the designer.

Based on the foregoing difficulties, it is apparent that there is a need for an improved cylindrical Fresnel lens with an enhanced diffuser and aesthetic appearance, and which offers the effective usage of light while simultaneously reducing both production and performance costs. It is believed that a solution to these needs is described in greater detail herein.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for an improved collimating lens.

It is another aspect of the present invention to provide for an improved cylindrical Fresnel lens with an enhanced diffuser that offers an aesthetic appearance.

The aforementioned aspects and other objectives and advantages can now be achieved as described herein. A cylindrical Fresnel lens having a curved surface and a large number of Fresnel lens steps with rectangular cross sections for enhancing the aesthetics and diffuser appearance is disclosed herein. The cylindrical Fresnel lens can be uniformly divided into rectangular sections across the lens axis. Alternative rectangular sections can be offset from the curved surface by a distance, which produces a very parallel output beam. The front face of the cylindrical Fresnel lens can generate a square-like pattern, which is appealing while offering an enhanced and effective usage of light that is easy an inexpensive to produce.

The rectangular sections of the Fresnel lens are generally formed so that light emanating from a rear focus is converted into substantially parallel beams by reflection through the lens. The alternative rectangular sections have continuously or incrementally varying angulations, and may be formed with an offset of, for example, approximately 0.5 mm. The Fresnel lens can be configured with a checked appearance and can be utilized with any lamp for enhance diffuser applications and an aesthetic appearance.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1:
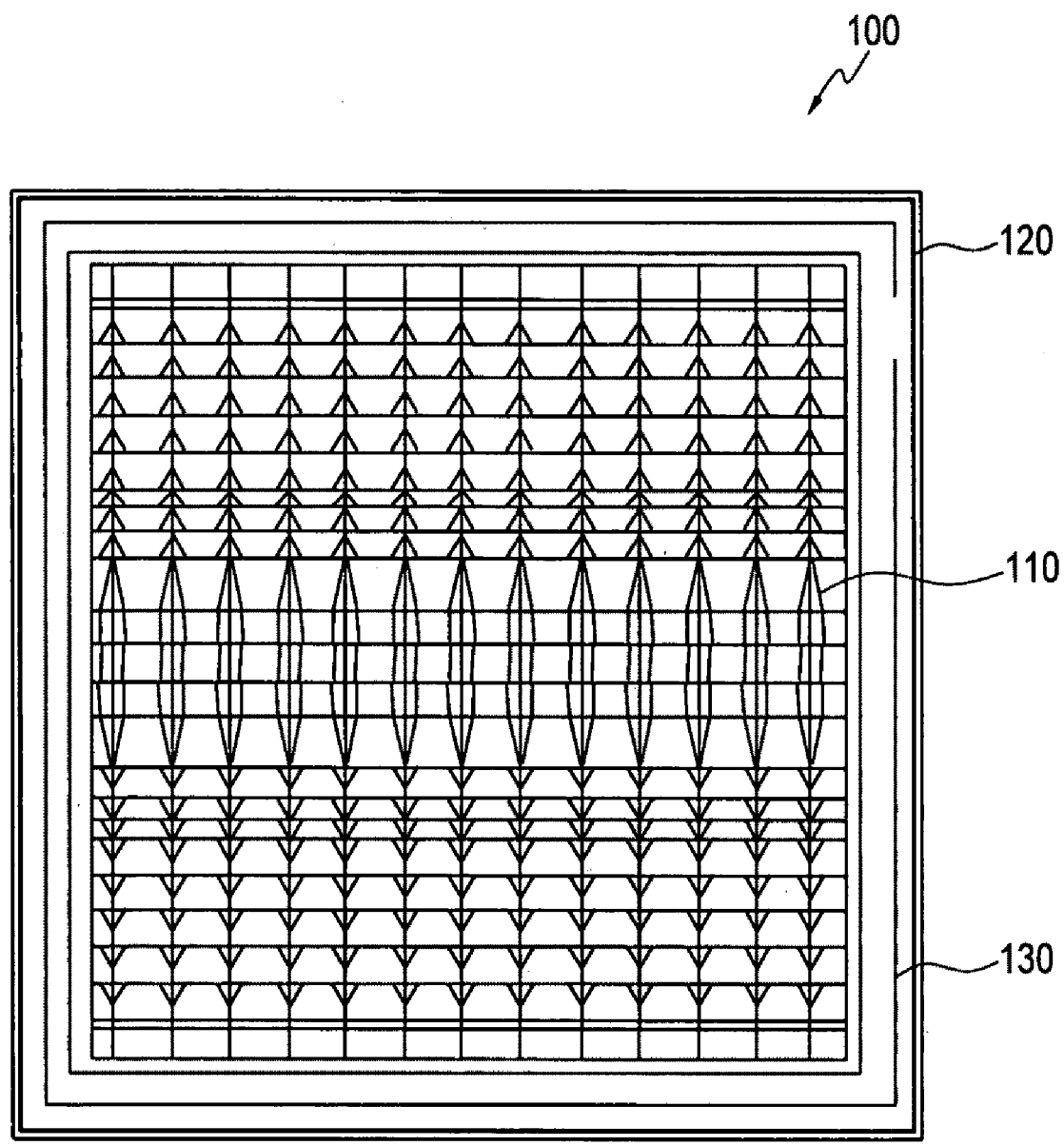
FIG. 1 illustrates a front view of a prior art Fresnel lens with "V" grooves.
Figure 2:
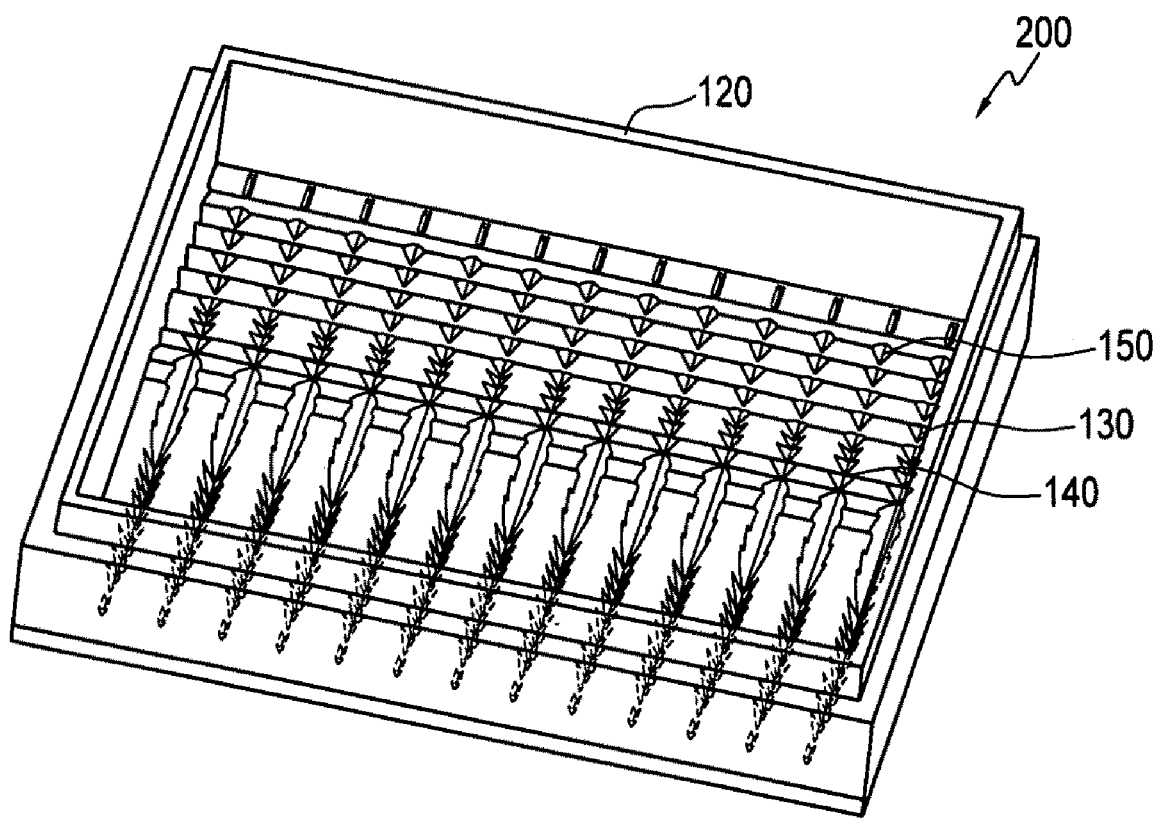
FIG. 2 illustrates a perspective view of the prior art Fresnel lens with "V" grooves.
Figure 3:
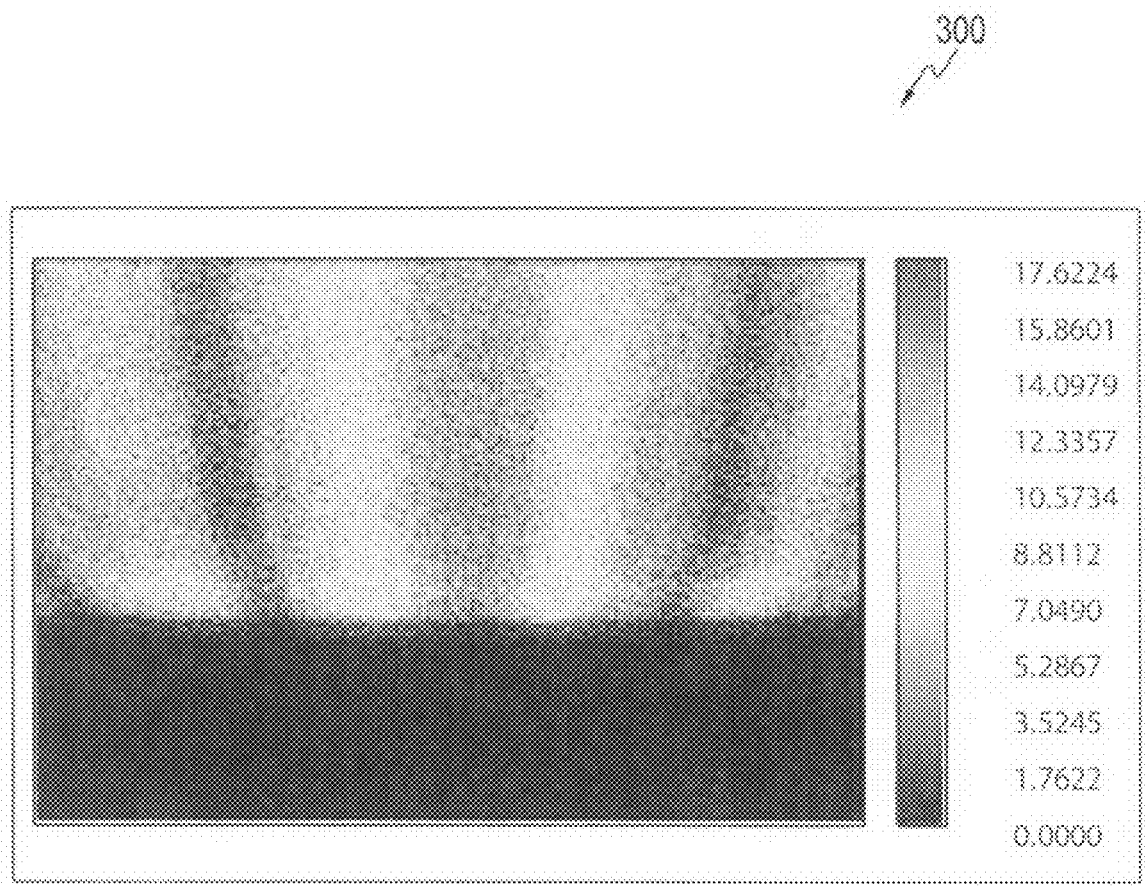
FIG. 3 illustrates a simulation result of the prior art Fresnel lens with "V" grooves.
Figure 4:
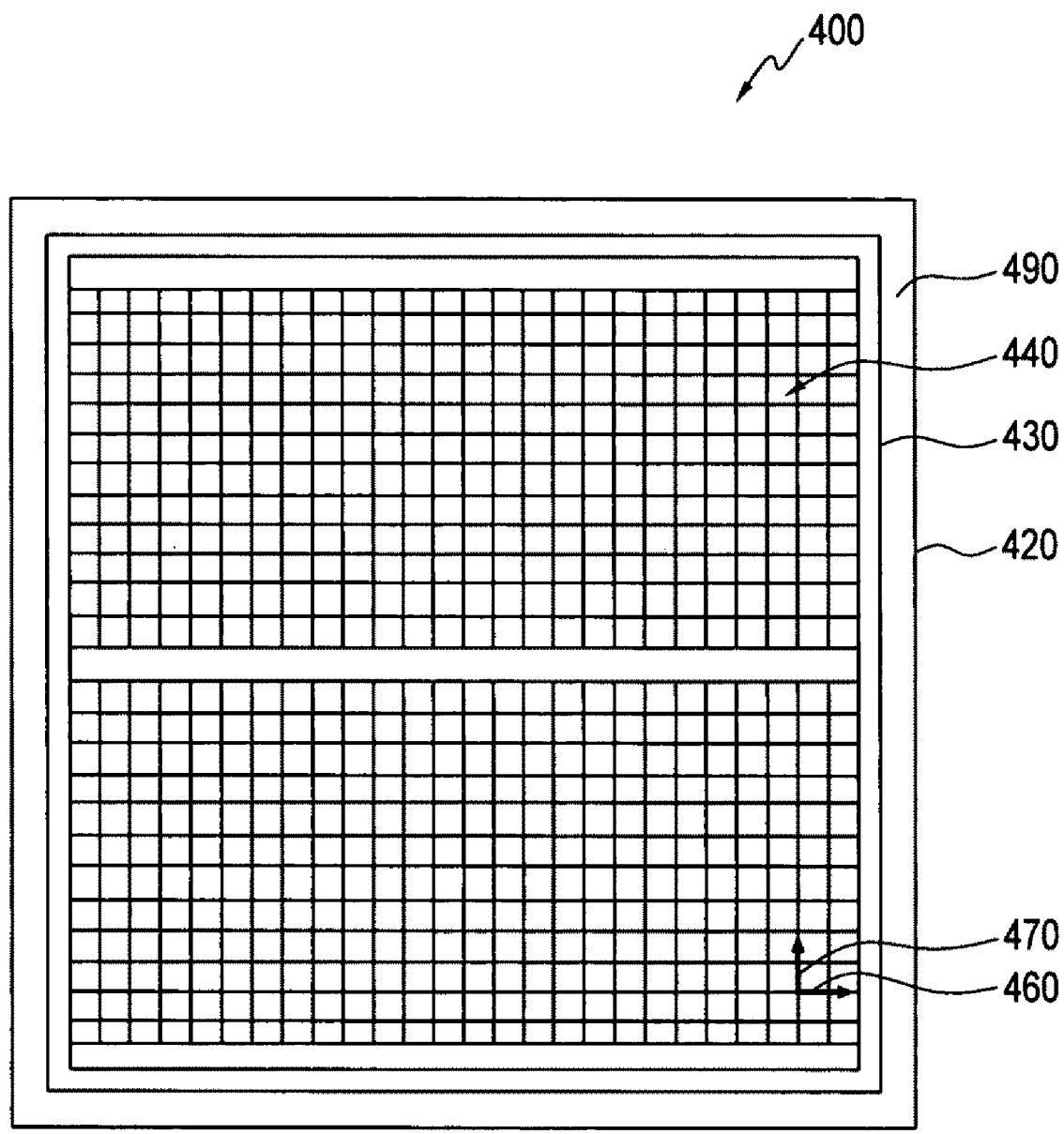
FIG. 4 illustrates a front view of a Fresnel lens with rectangular sections, which can be implemented in accordance with a preferred embodiment.

Referring to FIG. 4, a front view of a Fresnel lens 400 with rectangular sections is illustrated, in accordance with a preferred embodiment. The Fresnel lens 400 depicted in FIG. 4 is preferably configured from an infrared transmitting plastic, such as, for example, polyethylene, and can include a body with a front face 440 and a mounting bracket 420. The Fresnel lens 400 can be divided into rectangular sections 420 across the lens axis at variable heights. The Fresnel lens 400 includes a horizontal axis designated by reference number 460 and a vertical axis designated by reference number 470. Horizontal axis 460 and vertical axis 470 are oriented perpendicular to each other. The rectangular sections 420 can be utilized to illuminate an area evenly with an effective usage of light. The Fresnel lens 400 reduces the amount of material required compared to a conventional spherical lens by breaking the lens 400 into rectangular sections 420 known as Fresnel zones.

Figure 5:
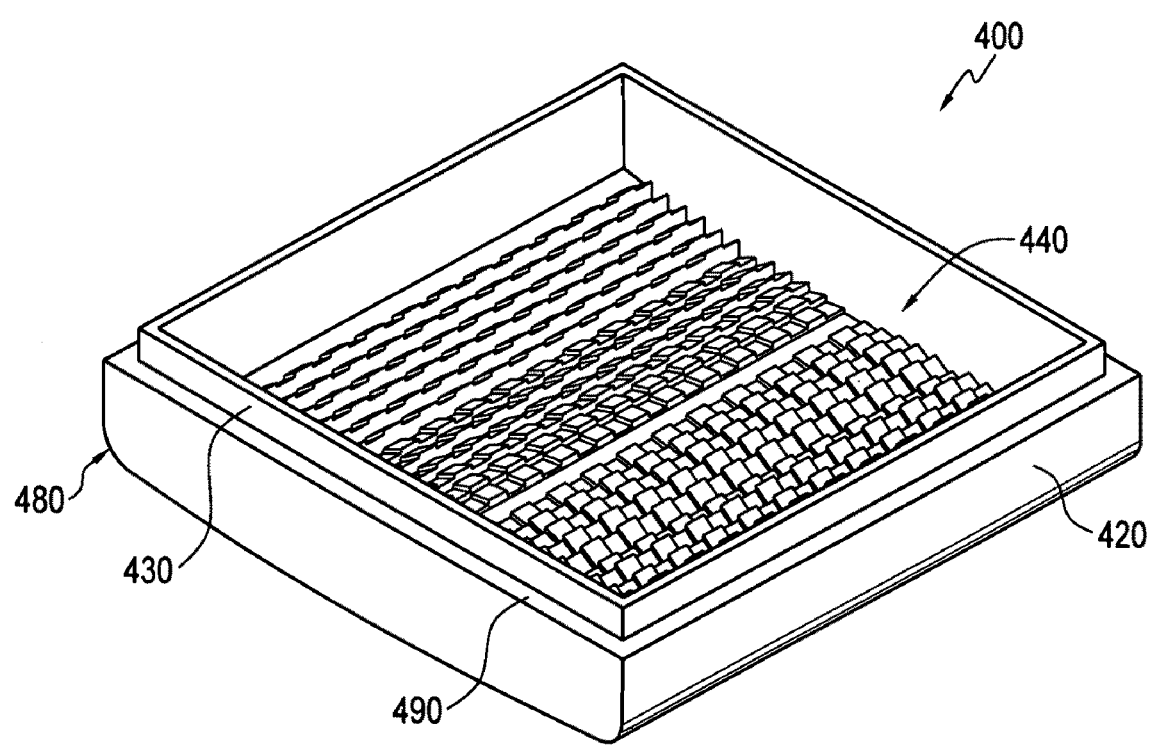
FIG. 5 illustrates a perspective view of the Fresnel lens with rectangular sections, which can be implemented in accordance with a preferred embodiment.

Referring to FIG. 5 a perspective view of Fresnel lens 400 with rectangular sections is illustrated, in accordance with a preferred embodiment. Note that in FIGS. 4-9, identical or similar blocks and elements are generally indicated by identical reference numerals. The Fresnel lens 400 includes a curved surface 480 and can also include a Fresnel lens step 490. Although a single lens step 490 is shown in FIG. 5, it can be appreciated that a large number of lens steps may be added to the configuration depicted in FIG. 5, in accordance with other embodiments. The Fresnel lens 400 can be formed from a plurality of discrete rectangular sections such as, for example, section 430 and can be joined together side to side, depending upon design considerations. The Fresnel lens 400 can be placed on the mounting bracket 420. The Fresnel lens 400 has several advantages over the prior art. The rectangular shape of the Fresnel lens 400, for example, can be implemented to minimize the thickness of the lens.

Figure 6:
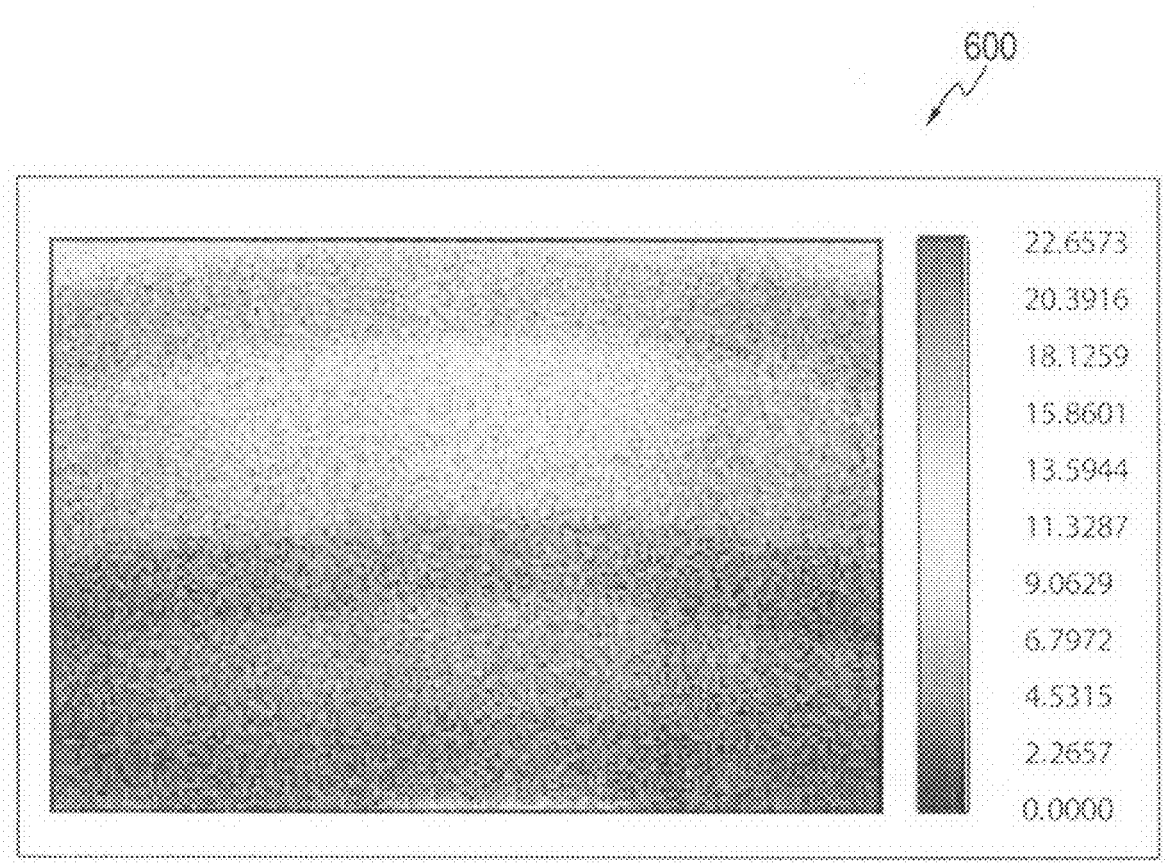
FIG. 6 illustrates a simulation result of the Fresnel lens with rectangular sections, in accordance with an exemplary embodiment.

Referring to FIG. 6, a simulation result of Fresnel lens with rectangular sections 600 is illustrated, in accordance with an exemplary embodiment. As depicted in the simulation 600, the total light at the required location is 6.4 lumens, which indicates a 50% increase in light output thereby producing both an enhanced aesthetic appearance and diffuser applications.

Figure 7:
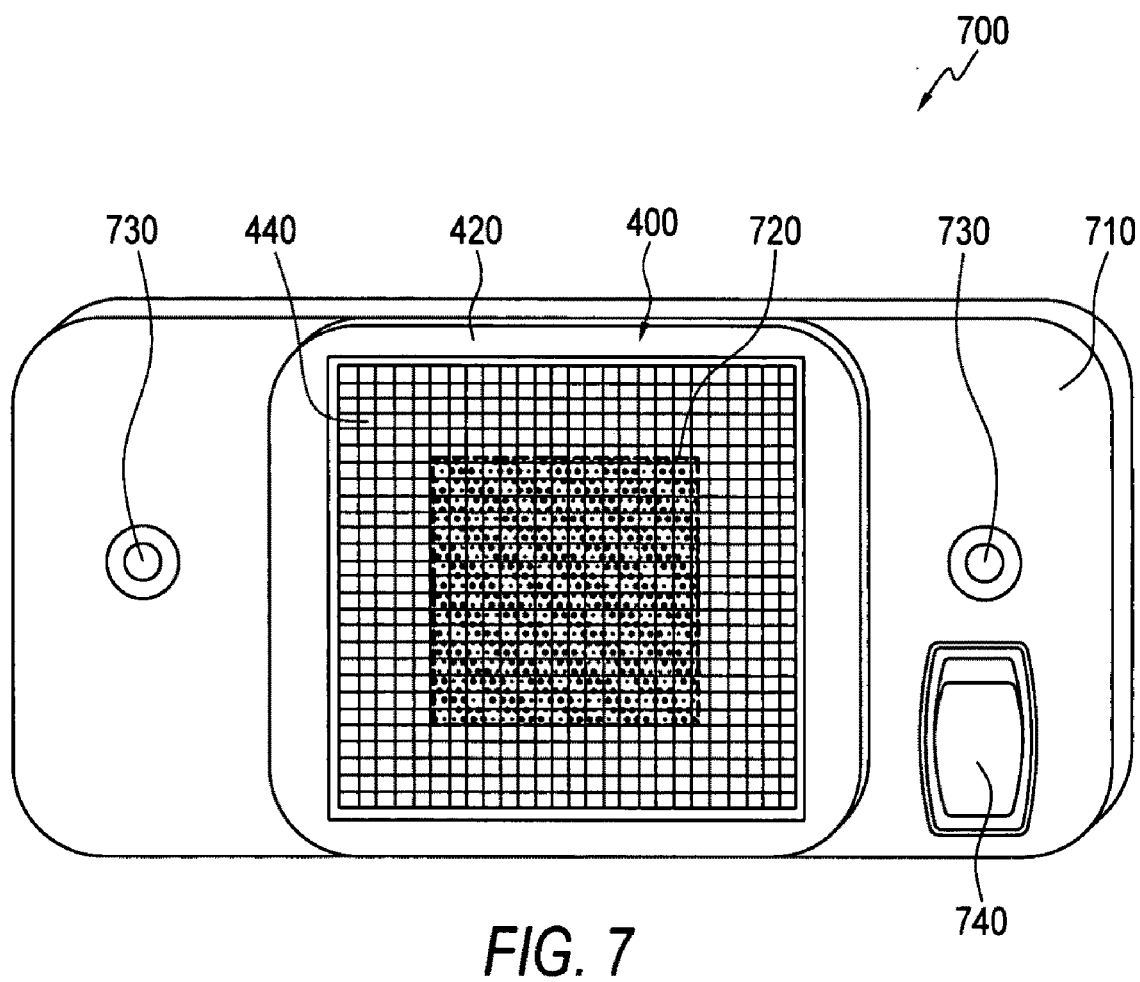
FIG. 7 illustrates a perspective view of a lamp having cylindrical Fresnel lens with diffuser appearance, in accordance with an exemplary embodiment.

Referring to FIG. 7, a perspective view of a lighting equipment 700 having cylindrical Fresnel lens 400 with diffuser appearance is illustrated, in accordance with an exemplary embodiment. The lighting equipment 700 can be provided on a housing 710 that supports a light source 720 and the Fresnel lens 400. The Fresnel lens 400 and the mounting bracket 420 can be coupled to the housing 710. The Fresnel lens 400 with rectangular cross section 430 can be arranged at variable heights so that the light output cannot be lost. Light source 720 produces substantially omni-directional light rays. The light rays radiated from light source 720 which are directed to the Fresnel lens 400 so that light is converted into substantially parallel beams by reflection through the Fresnel lens 400.

The light radiated from the light source 720 located at the focal point of the Fresnel lens 400, becomes a parallel beam after being transmitted through Fresnel lens 400. The Fresnel lens 400 directs the light frontward with a predetermined angle, and projected frontward as a reflected light to the required area. Using such a Fresnel lens 400, it is possible to promote downsizing of the light while ensuring high efficiency. A main switch 740 can be positioned adjacent mounting bracket 420 to hold the ON and OFF of the lighting equipment 700. The mounting hole 730 can be formed on the housing 710 which can be utilized for mounting the lighting equipment 700.

Figure 8:
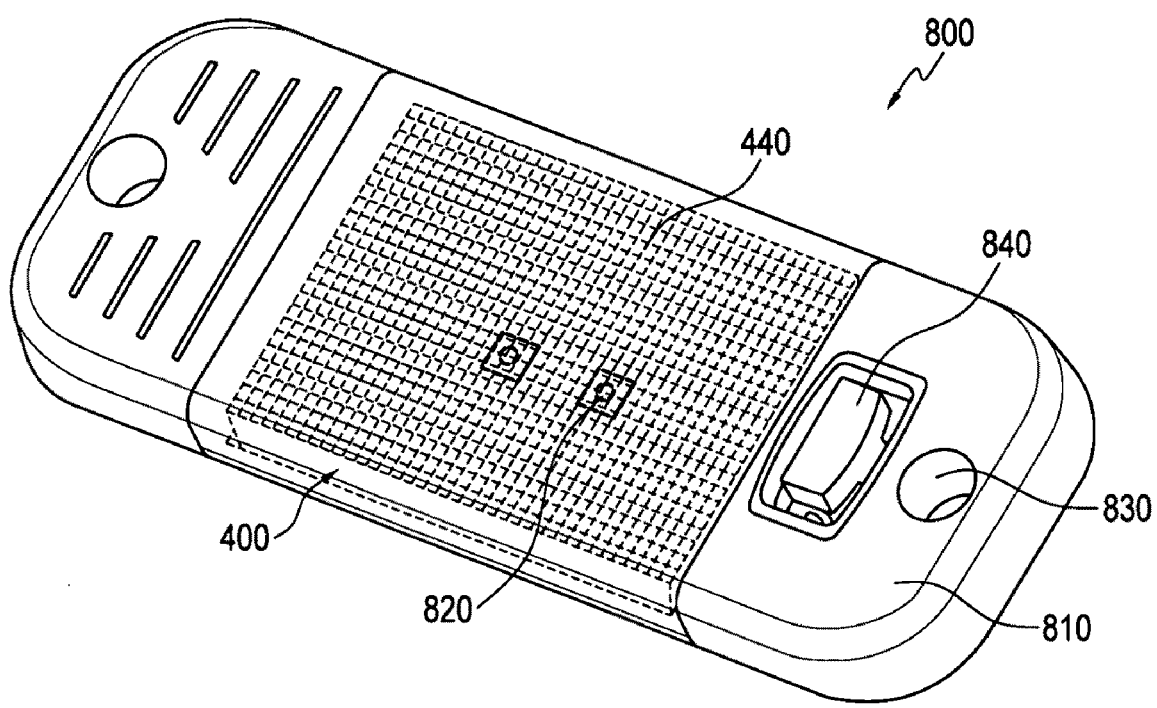
FIG. 8 illustrates a perspective view of a lamp with cylindrical Fresnel lens and offset, in accordance with an alternative embodiment.

Referring to FIG. 8, a perspective view of a lamp 800 with cylindrical Fresnel lens 400 and offset is illustrated, in accordance with another exemplary embodiment. The lamp 800 includes a housing 810, the Fresnel lens 400, a main switch 840 and a mounting hole 830. The Fresnel lens 400 with rectangular sections 430 arranged with an offset of 0.5 mm. The dimensions are described for purposes of clarity and specificity; however, they should not be interpreted in any limiting way. Other dimensions are possible. The front face 440 of the Fresnel lens 400 generally provides a square like pattern with an aesthetic appearance. The advantage of Fresnel lens 400 with rectangular sections 430 is that the best possible utilization of the light beams radiating from the light source 820 is provided, which is positioned adjacent and at the focal point of the lens 400, for use for a light distribution area in the main radiation direction.

Figure 9:
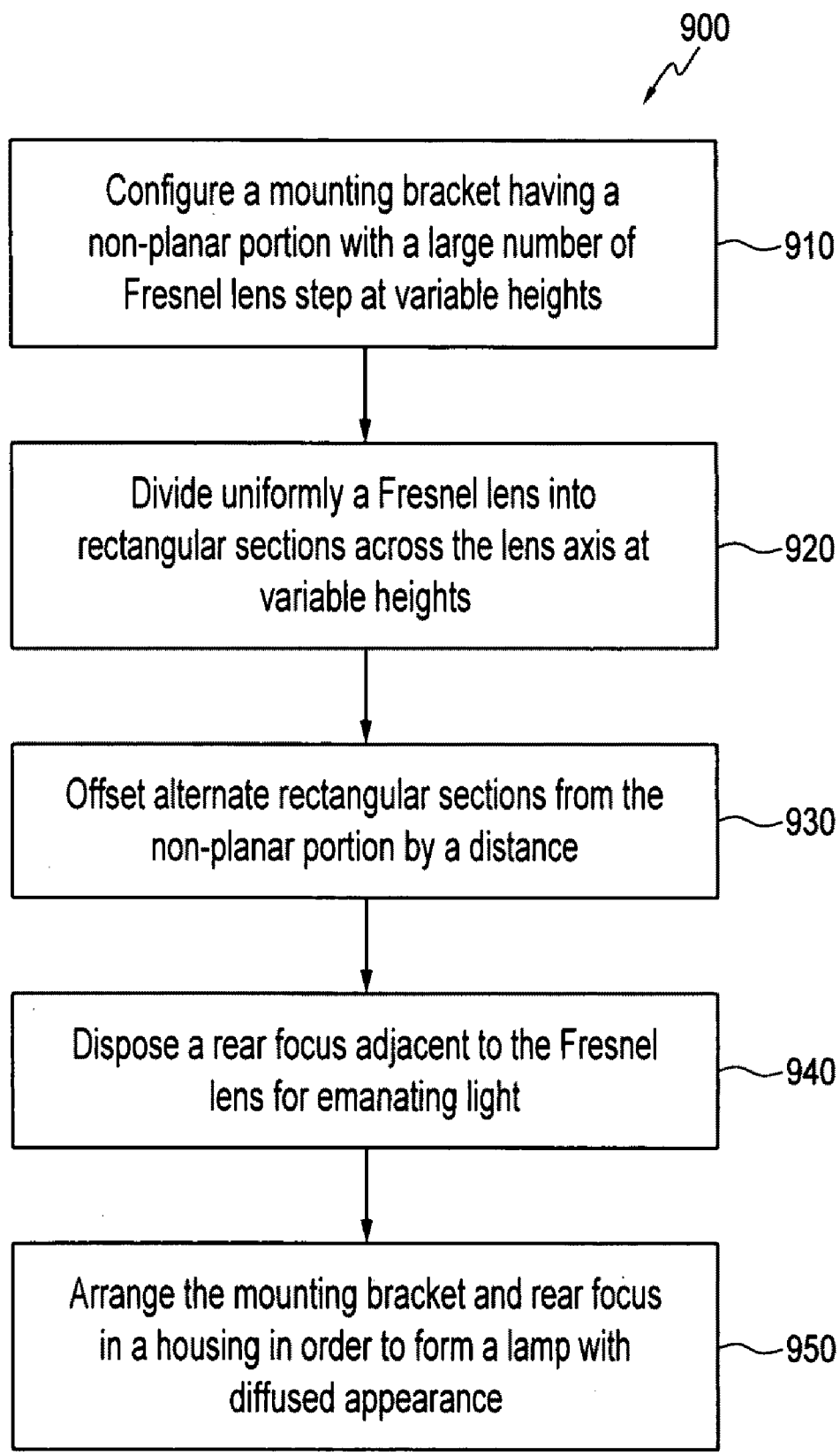
FIG. 9 illustrates a detailed flow chart of operations illustrating logical operational steps of a method for improving aesthetic and diffuser appearance of collimating Fresnel lens, in accordance with an alternative embodiment.

Referring to FIG. 9 a detailed flow chart of operations illustrating logical operational steps of a method 900 for improving aesthetic and diffuser appearance of collimating Fresnel lens 400 is illustrated, in accordance with an alternative embodiment. Note that in FIGS. 4-9, identical or similar blocks and elements are generally indicated by identical reference numerals. As indicated at block 910, a mounting bracket 420 having a non-planar portion or a curved surface 480 can be configured with a large number of Fresnel lens steps 490 at variable heights. Next, as depicted at block 920, a Fresnel lens 400 can be uniformly divided into rectangular sections 430 across the lens axis.

The alternate rectangular sections 430 are offset from the non-planar portion by a distance of 0.5 mm, as shown at block 930. A rear focus component such as, for example, a light source 720 can be disposed adjacent to the Fresnel lens 400 for emanating light, which is converted into substantially parallel beams by reflection through the Fresnel lens 400, as described at block 940. Thereafter, as illustrated at block 950, the mounting bracket 420 and rear focus 720 can be arranged in a housing 710 in order to form a lamp with a diffused appearance such as that depicted in FIGS. 7-8.

Based on the foregoing it can be appreciated that a Fresnel lens, such as, for example, lens 400, can be employed to enhance the aesthetic appeal, which provides an appearance close to that of a diffuser. The main advantage of the Fresnel lens 400 with rectangular sections is that it is possible to increase the light output at the required area. The front face 850 of the Fresnel lens 400 can generate a square like pattern, which is appealing and provides an effective usage of light while reducing costs. The Fresnel lens has a checked appearance and can be utilized with any lamp such as that shown in FIGS. 7-8 for an enhanced diffuser application while offering an aesthetic appearance.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A Fresnel lens apparatus, comprising:
   a Fresnel lens;
   a mounting bracket associated with said Fresnel lens, wherein said mounting bracket includes a non-planar portion with a plurality of Fresnel lens steps of variable heights configured on said mounting bracket and for mounting said Fresnel lens thereon; and
   a plurality of rectangular sections associated with said Fresnel lens, wherein said plurality of rectangular sections are provided by uniformly dividing said Fresnel lens across a Fresnel lens axis of said Fresnel lens, wherein a plurality of alternative sections among said plurality of rectangular sections are offset from said non-planar portion by a particular distance in order to provide an effective usage of a light with respect to said Fresnel lens.

2. The apparatus of claim 1 further comprising:
   a rear focus component disposed adjacent to said Fresnel lens for emanating and converting said light into substantially parallel beams by reflection through said Fresnel lens.

3. The apparatus of claim 1 wherein said Fresnel lens comprises a front face having a square like pattern for enhanced aesthetic appeal.

4. The apparatus of claim 1 wherein said Fresnel lens collimates said light in a direction parallel to said mounting bracket through which said light from said rear focus enters.

5. The apparatus of claim 1 wherein said plurality of rectangular sections formed from said Fresnel lens comprises a substantially uniform thickness that increases said light output to a required area.

6. The apparatus of claim 1 wherein said Fresnel lens and said rear focus comprises a housing that assists in providing a lamp with a diffused appearance.

7. The apparatus of claim 1 wherein said plurality of rectangular sections minimizes a thickness of said Fresnel lens.

8. A Fresnel lens apparatus, comprising:
   a Fresnel lens;
   a mounting bracket associated with said Fresnel lens, wherein said mounting bracket includes a non-planar portion with a plurality of Fresnel lens steps of variable heights configured on said mounting bracket and for mounting said Fresnel lens thereon;
   a plurality of rectangular sections associated with said Fresnel lens, wherein said plurality of rectangular sections are provided by uniformly dividing said Fresnel lens across a Fresnel lens axis of said Fresnel lens, wherein a plurality of alternative sections among said plurality of rectangular sections are offset from said non-planar portion by a particular distance in order to provide an effective usage of a light with respect to said Fresnel lens; and
   a rear focus component disposed adjacent to said Fresnel lens for emanating and converting said light into substantially parallel beams by reflection through said Fresnel lens.

9. The apparatus of claim 8 wherein said Fresnel lens comprises a front face having a square like pattern for enhanced aesthetic appeal.

10. The apparatus of claim 8 wherein said Fresnel lens collimates said light in a direction parallel to said mounting bracket through which said light from said rear focus enters.

11. The apparatus of claim 8 wherein said plurality of rectangular sections formed from said Fresnel lens comprises a substantially uniform thickness that increases said light output to a required area.

12. The apparatus of claim 8 wherein said Fresnel lens and said rear focus comprises a housing that assists in providing a lamp with a diffused appearance and wherein said plurality of rectangular sections minimizes a thickness of said Fresnel lens.

13. A method of configuring an improved Fresnel lens, comprising:
   providing a Fresnel lens;
   associating a mounting bracket with said Fresnel lens;
   configuring said mounting bracket to include a non-planar portion with a plurality of Fresnel lens steps of variable heights configured on said mounting bracket and for mounting said Fresnel lens thereon; and
   associating a plurality of rectangular sections with said Fresnel lens, wherein said plurality of rectangular sections are provided by uniformly dividing said Fresnel lens across a Fresnel lens axis of said Fresnel lens, wherein a plurality of alternative sections among said plurality of rectangular sections are offset from said non-planar portion by a particular distance in order to provide an effective usage of a light with respect to said Fresnel lens.

14. The method of claim 13 further comprising:
   disposing a rear focus component adjacent to said Fresnel lens for emanating and converting said light into substantially parallel beams by reflection through said Fresnel lens.

15. The method of claim 13 further comprising configuring said Fresnel lens to comprise a front face having a square-like pattern for an enhanced aesthetic appeal.

16. The method of claim 13 further comprising modifying said Fresnel lens to collimate said light in a direction parallel to said mounting bracket through which said light from said rear focus enters.

17. The method of claim 13 further comprising configuring said plurality of rectangular sections from said Fresnel lens to comprise a substantially uniform thickness that increases said light output to a required area.

18. The method of claim 13 further comprising configuring said Fresnel lens and said rear focus to comprise a housing that assists in providing a lamp with a diffused appearance.

19. The method of claim 13 wherein said plurality of rectangular sections minimizes a thickness of said Fresnel lens.

20. The method of claim 13 further comprising:
configuring said Fresnel lens to comprise a front face having a square-like pattern for an enhanced aesthetic appeal;
modifying said Fresnel lens to collimate said light in a direction parallel to said mounting bracket through which said light from said rear focus enters; and
configuring said plurality of rectangular sections from said Fresnel lens to comprise a substantially uniform thickness that increases said light output to a required area.

* * * * *